United States Patent [19]

Watakabe et al.

[11] Patent Number: 4,473,625
[45] Date of Patent: Sep. 25, 1984

[54] ZINC-HALOGEN BATTERY

[75] Inventors: Yuichi Watakabe; Fumiaki Fujisaki, both of Yokohama; Shunji Shimizu, Tokyo; Kunihiko Fujiwara, Yokohama, all of Japan

[73] Assignee: The Furukawa Electric Company, Ltd., Tokyo, Japan

[21] Appl. No.: 484,834

[22] Filed: Apr. 14, 1983

[30] Foreign Application Priority Data

Apr. 23, 1982 [JP] Japan ................................ 57-68499

[51] Int. Cl.$^3$ ........................................... H01M 10/36
[52] U.S. Cl. .................................... 429/105; 429/199; 429/207; 429/229
[58] Field of Search ............... 429/105, 199, 206, 207, 429/229, 203

[56] References Cited

U.S. PATENT DOCUMENTS

| | | | |
|---|---|---|---|
| 3,623,911 | 11/1971 | Oswin | 429/206 X |
| 3,642,539 | 2/1972 | Kawakami | 429/207 |
| 3,953,302 | 4/1976 | Rao et al. | 204/14 N |
| 4,084,047 | 4/1978 | Himy et al. | 429/206 |
| 4,181,777 | 1/1980 | Spaziante et al. | 429/105 X |
| 4,307,159 | 12/1981 | Hammond et al. | 429/105 |

Primary Examiner—Anthony Skapars
Attorney, Agent, or Firm—Oblon, Fisher, Spivak, McClelland & Maier

[57] ABSTRACT

A zinc-halogen battery having a negative electrode of zinc electrode, a positive electrode of halogen electrode, and an electrolyte of aqueous solution containing a zinc halide as a main component thereof, which is characterized in that said electrolyte contains Tl and/or Tl compound and further at least one additive selected from the group consisting of Mo, W, Sn, Pb, Bi and the compounds thereof, if necessary, with addition of In and/or In compound.

8 Claims, 2 Drawing Figures

ZINC-HALOGEN BATTERY

DETAILED DESCRIPTION OF THE INVENTION

The present invention relates to a zinc-halogen battery in which, in particular, a smoothed zinc is deposited on a negative electrode out of electrolyte during period of charge and the zinc remaining at a part of the negative electrode is promptly dissolved after discharge.

The zinc-halogen battery is a secondary battery of an electrolyte circulation type which comprises a zinc electrode as negative electrode, halogen electrode as positive electrode and an aqueous electrolyte containing zinc halide as a main component. In the battery, zinc is deposited on the negative electrode during charge and the deposited zinc is dissolved during discharge. The zinc is inexpensive as an active material and has a high energy density, but has a defect of producing a dendritic deposition instead of a smooth deposition during charge so that an internal short circuit accurs and another defect that the deposited zinc peels off easily.

As for the prevention of the dendritic deposition of zinc, many studies have been carried out for alkaline batteries, for example, nickel-zinc battery, and effective additives are known. However, the zinc-halogen battery is quite different in the behavior of additives from the alkaline batteries since the former battery uses an acidic electrolyte. For example, lead is known as an effective additive to prevent the dendritic deposition for the alkaline batteries. However, if the lead is added to the acidic batteries, it is known that the dendritic deposition is encouraged on the contrary.

In recent years, soluble polyester compound and reactive product of amine and epichlorohydrin have been proposed as the additives for the alkaline batteries and practically obtained are good results. However, for the zinc-halogen battery, since the halogen with very large reactivity is dissolved into the electrolyte in a high concentration, the above-mentioned organic compounds easily react with and are decomposed by the halogen during use, thereby failing to maintain their expected effect of preventing the dendritic deposition of zinc for a long period of time.

In view of the above results, one of the inventors for this invention studied inorganic additives expected to have a high halogen durability and the effect of the prevention of the dendritic deposition of the zinc during charge in the zinc-halogen battery, and found and proposed that addition to the electrolyte of one or more additives selected from elements Ga, In, Tl or compounds thereof had prevented the dendritic deposition of the zinc stably for a long period of time. However, although these elements or compounds thereof are effective in preventing the dendritic deposition of the zinc, the addition of only one of the elements or compounds make it difficult to charge for a long period of time and with the addition of two or more of the elements or compounds thereof, there is a problem that, when the battery is charged with the zinc remaining at a part of negative electrode after discharge, the dendritic deposition grows precedently on the zinc remaining part, thereby causing an internal short circuit.

In the light of the foregoing problem, we have studied additives and developed zinc-halogen batteries in which the new combination of the additives prevent the dendritic deposition of the zinc for a long period of time, thereby depositing a smooth zinc on the negative electrode and making repeated charges and discharges possible for a long period of time with free and rapid dissolution of the deposit remaining at a part of negative electrode after discharge. Such batteries are therefore capable of storing a very large amount of electricity in each charge.

A battery according to this invention comprises a zinc electrode as negative electrode, a halogen electrode as positive electrode, and an aqueous electrolyte comprising a zinc halide as main component, Tl or compound thereof, and one or more additives of either elements; Mo, W, Sn, Pb, Bi or compounds thereof.

Further, another battery of this invention comprises a zinc electrode as negative electrode, a halogen electrode as positive electrode, an an aqueous electrolyte comprising a zinc halide as main component, Tl or compound thereof, In or compound thereof, and one or more of either elements; Mo, W, Sn, Pb, Bi or compounds thereof.

Usually these elements, Tl, In, Mo, W, Sn, Pb and Bi, are added to the electrolyte as chloride, sulfate, nitrate, etc. These additive elements or compounds are dissolved into the electrolyte to form respectively single cation or complex ion so as to prevent the dendritic deposition of the zinc during charge of a battery. The concentration of these elements or compounds thereof is preferably in the range from $10^{-5}$ to $10^{-1}$ mol/l as per respective elements or compounds. In case the concentration of the respective additives to less than this range, the effect on the prevention of the dendritic deposition of the zinc is not sufficient. If the respective additives are added in a concentration above the range, the additive elements or compounds deposit in excess as metal on a zinc electrode and an excessive quantity of electricity is consumed for the deposition, thereby causing the problem of reduced efficiency of charge and discharge.

Addition of In or In compound to the aqueous electrolyte together with Tl or Tl compound and one or more of Mo, W, Sn, Pb, Bi and compounds thereof is more effective in preventing the dendritic deposition of zinc.

The electrolyte is, as conventionally, an aqueous solution of zinc-halide only, or further may be added thereto sodium halide, potassium halide, etc. in an amount of not more than 5 mol/l, preferably not more than 3 mol/l, in total in order to increase its conductivity. The aqueous electrolyte is in the range of pH 0-5, preferably 0.1-1.0. Further, the current density during charge is preferably 5-100 MA/cm$^2$ and the temperature of electrolyte is preferably from room temperature to approximately 70° C.

The invention will be more clearly understood with reference to the following examples.

EXAMPLES

Figure 1:
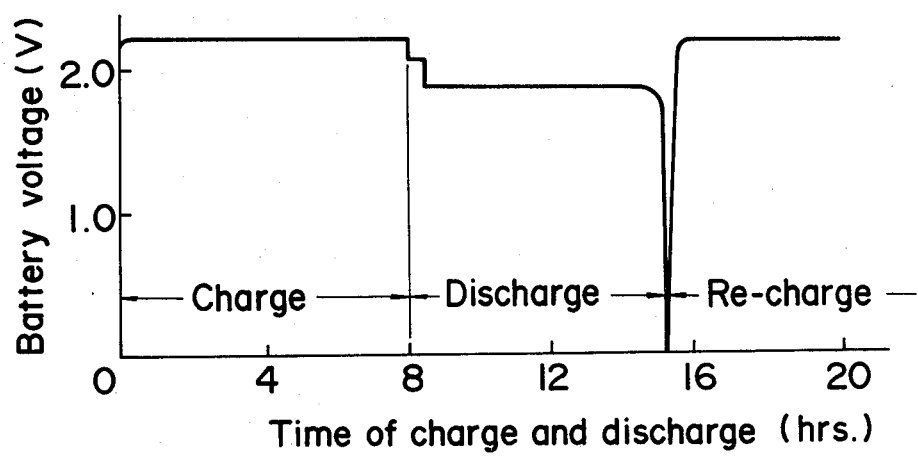
FIG. 1 shows an illustration indicating charge and discharge curves of the battery for this invention.

The additive elements or compounds indicated in Table 1 were adden into an aqueous solution containing zinc chloride 2 mol/l and potassium chloride 1 mol/l and pH was adjusted to 1.0. The electrolyte was circulated into a single cell provided with a porous graphite plate as positive electrode and a dense graphite plate as negative electrode.

or kept under the condition of the external short circuit for more than 10 hours with the circulation of the electrolyte.

As mentioned above, the battery of this invention has

TABLE 1

| Battery | No. | Additive elements or Compounds thereof (mol/l) | | | | | | | State of zinc deposit |
|---|---|---|---|---|---|---|---|---|---|
| | | Tl | In | Mo | W | Sn | Pb | Bi | |
| Batteries of this Invention | 1 | $10^{-4}$ | | $10^{-2}$ | | | | | A |
| | 2 | $10^{-4}$ | | | | | $10^{-4}$ | | A |
| | 3 | $10^{-4}$ | | | | | | $10^{-4}$ | A |
| | 4 | $10^{-3}$ | | | $10^{-5}$ | | $10^{-4}$ | | A |
| | 5 | $10^{-4}$ | | | $10^{-4}$ | $10^{-5}$ | | $10^{-4}$ | A |
| | 6 | $10^{-5}$ | | | $10^{-4}$ | | $10^{-3}$ | $10^{-4}$ | A |
| | 7 | $10^{-4}$ | | $10^{-4}$ | | $10^{-4}$ | | $10^{-3}$ | A |
| | 8 | $10^{-4}$ | | $10^{-3}$ | | | | | A |
| | 9 | $10^{-4}$ | $10^{-4}$ | $10^{-4}$ | | | | | A |
| | 10 | $10^{-4}$ | $10^{-5}$ | | | | | $10^{-4}$ | A |
| | 11 | $10^{-4}$ | $10^{-3}$ | | | | $10^{-4}$ | | A |
| | 12 | $10^{-4}$ | $10^{-3}$ | $10^{-4}$ | | $10^{-4}$ | | | A |
| | 13 | $10^{-4}$ | $10^{-5}$ | | $10^{-5}$ | | $10^{-5}$ | $10^{-4}$ | A |
| | 14 | $10^{-3}$ | $10^{-4}$ | | | $10^{-4}$ | | | A |
| | 15 | $10^{-4}$ | $10^{-4}$ | | $10^{-5}$ | | | $10^{-2}$ | A |
| | 16 | $3 \times 10^{-4}$ | | | | | | $3 \times 10^{-4}$ | A |
| | 17 | $5 \times 10^{-4}$ | | | | | | $5 \times 10^{-4}$ | A |
| | 18 | $10^{-4}$ | $10^{-4}$ | | | | | $10^{-4}$ | A |
| | 19 | $10^{-4}$ | $3 \times 10^{-4}$ | | | | | $10^{-4}$ | A |
| Comparative batteries | 20 | $10^{-4}$ | $10^{-4}$ | | | | | | B |
| | 21 | $10^{-4}$ | | | | | | | B |
| | 22 | | $10^{-4}$ | | | | | | C |
| | 23 | | | $10^{-4}$ | | | | | B |
| | 24 | | | | $10^{-4}$ | | | | C |
| | 25 | | | | | $10^{-4}$ | | | C |
| | 26 | | | | | | $10^{-4}$ | | B |
| | 27 | | | | | | | $10^{-4}$ | B |
| | 28 | | $10^{-4}$ | $10^{-4}$ | | | | | B |
| | 29 | | $10^{-4}$ | | | | $10^{-4}$ | | B |
| | 30 | | | $10^{-4}$ | $10^{-4}$ | | | | C |
| | 31 | | $10^{-4}$ | | | | $10^{-4}$ | | C |
| | 32 | | $10^{-4}$ | | | $10^{-4}$ | | | C |
| | 33 | | | $10^{-4}$ | | $10^{-4}$ | | | B |

A: No dendritic deposition of zinc was observed on the negative electrode; therefore large capacity storage of electricity in each charge and many times repeated charges and discharges are possible. Further no compulsory discharge is required to start recharge.
B: Dendritic deposition of zinc was observed at a part of the negative electrode, thus causing an internal short circuit.
C: Dendritic deposition of zinc was observed all over the negative electrode, thus causing an internal short circuit.

Further, Tl, In, W, Sn, Pb and Bi of Table 1 were respectively added as chloride and Mo was added as sodium salt.

Figure 2:
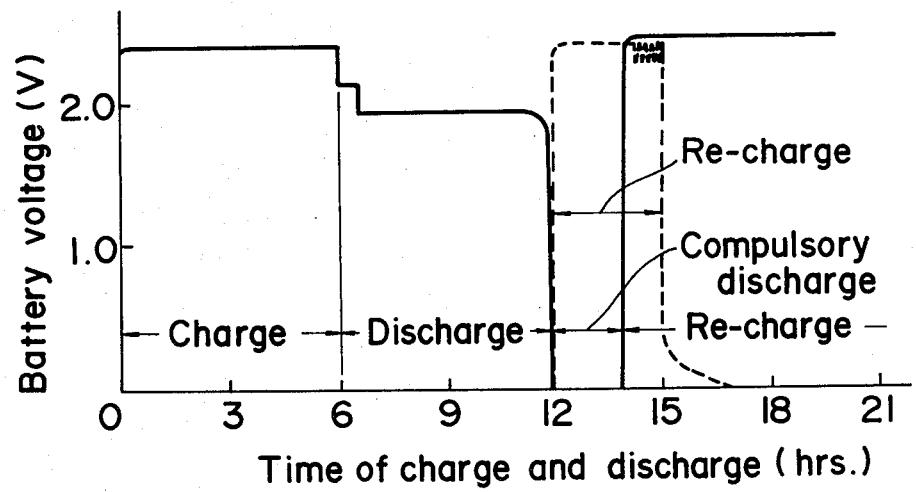
FIG. 2 shows an illustration indicating charge and discharge curves of the battery as previously proposed.

As for each battery thus composed, a charge was given for 8 hours at current density 30 A/cm$^2$ and electrolyte temperature 30° C., and then a dendritic deposition of zinc on negative electrode was examined. As a result, the dendritic deposition was not found in every batter. In case of a discharge after the charge, the battery of this invention was polarized rapidly at an end of the discharge as indicated in FIG. 1 and a charge immediately after the discharge had no problem of causing an internal short circuit and 90% or more of current efficiency was maintained. Furthermore, while charges and discharges were repeated on the same condition for one month, no generation of the internal short circuit was observed. In contrast to the above results, in comparative batteries, when a charge was carried out immediately after discharge, dendritic deposition of zinc was formed on a deposit of zinc remaining at a part of negative electrode after the discharge and the internal short circuit occurred in less than two hours, as indicated with dotted lines in FIG. 2. In order to avoid the generation of the internal short circuit, it is understood that the battery is required to be subjected to a compulsory discharge after the discharge by means of external power source for 1-2 hours as indicated with full lines conspicuous industrial advantages in preventing the dendritic deposition of the zinc for a long period of time at one charge and permitting the charge after discharge without a compulsory discharge by means of external power source, and reducing a length of time between a discharge and a following charge.

What is claimed is:

1. A zinc-halogen battery equipped with a zinc electrode as the negative electrode, a halogen electrode as the positive electrode, and an aqueous electrolyte containing zinc halide as the main component, said electrolyte further comprising Tl and/or a Tl compound and at least one additive selected from the group consisting of compounds of the elements: Mo, W, Sn, Pb, and Bi or one of the elements per se.

2. The battery of claim 1, wherein said electrolyte additionally contains In and/or a In compound.

3. The battery of claim 1, wherein the compounds of the metal additives are the halide, sulfate and nitrate salts.

4. The battery of claim 2, wherein said In compound is a halide, sulfate or nitrate salt.

5. The battery of claim 1, wherein any given metal additive or compound thereof is present in the electrolyte in an amount within the range of $10^{-5}$ to $10^{-1}$ mol/l.

6. The battery of claim 1, wherein said electrolyte further contains sodium halide and/or potassium halide.

7. The battery of claim 1, wherein said aqueous electrolyte has a pH of 0–5.

8. The battery of claim 6, wherein said sodium halide or potassium halide is present in said electrolyte in an amount no more than 5 mol/l.

* * * * *